United States Patent [19]

Dalebout et al.

[11] Patent Number: 5,029,801
[45] Date of Patent: Jul. 9, 1991

[54] ADJUSTABLE INCLINE SYSTEM FOR EXERCISE EQUIPMENT

[75] Inventors: William T. Dalebout; S. Ty Measom, both of Logan; Scott R. Watterson, River Heights, all of Utah

[73] Assignee: Proform Fitness Products, Inc., Logan, Utah

[21] Appl. No.: 482,187

[22] Filed: Feb. 20, 1990

Related U.S. Application Data

[63] Continuation-in-part of Ser. No. 256,486, Oct. 12, 1988, Pat. No. 4,913,396.

[51] Int. Cl.⁵ .............................................. F16M 11/00
[52] U.S. Cl. ........................................ 248/649; 272/69
[58] Field of Search .................... 248/188.2, 371, 649, 248/188.5; 297/325, 345, 270; 272/69

[56] References Cited

U.S. PATENT DOCUMENTS

| | | | |
|---|---|---|---|
| 284,294 | 9/1883 | Graves | 297/345 X |
| 659,216 | 10/1900 | Dowling et al. | 297/345 X |
| 1,778,635 | 10/1930 | Heisler | 248/649 X |
| 2,440,644 | 4/1948 | Powell | 297/345 X |

*Primary Examiner*—Blair M. Johnson
*Attorney, Agent, or Firm*—Trask, Britt & Rossa

[57] ABSTRACT

An incline adjustment mechanism for use with exercise apparatus such as treadmills is disclosed. The mechanism includes a support or foot assembly rotatably mounted to the bottom surface of the treadmill frame. One or more springs are interposed between the treadmill frame and the support assembly for urging them outwardly from each other. A perforated strip mounted on the support assembly extends upwardly into proximity of the frame. A displaceable plunger shaft configured to be received within the apertures of the strip and form a union with that strip is mounted on the frame. The plunger is adapted to engage the strip and form a union therewith, thereby locking the support in an orientation which supports the treadmill at a selected orientation.

19 Claims, 5 Drawing Sheets

ADJUSTABLE INCLINE SYSTEM FOR EXERCISE EQUIPMENT

RELATED APPLICATIONS

This is a continuation-in-part application of pending application Ser. No. 256,486 entitled "ADJUSTABLE INCLINE SYSTEM FOR EXERCISE EQUIPMENT," filed Oct. 12, 1988.

BACKGROUND OF THE INVENTION

1. Field

This invention relates to incline support systems. More specifically, the invention is directed to support systems adapted for use with exercise equipment such as treadmills.

2. Statement of the Art

The functionality of many types of exercising equipment is enhanced by modifying the orientation of that equipment relative to an underlying support surface. In many instances, this capability to reorient the equipment permits the user to adjust and oftentimes increase the level of difficulty of exercises performed using the equipment. This capability becomes important when one recognizes that training, utilizing such equipment, is directed toward increasing the user's physical abilities. As those abilities are augmented, it is desirable that the user may periodically adjust the level of difficulty of the equipment to provide a device conducive to challenging the user's physical abilities and thereby contributing to an enhancement of those abilities.

The difficulties in rendering exercise equipment incline adjustable results in part from the weight of such equipment. Due to the stress which such equipment must endure in use, oftentimes such equipment is fabricated from various types of metals, which cause the equipment to be generally heavy. Adjusting the incline of the equipment may be difficult if the user must lift the equipment to the desired height and then manipulate a retaining device which is operable to retain the equipment at the desired height. As a result, some exercise equipment requires two or more individuals to adjust the incline thereof, i.e. one individual holding the equipment in place while the second actuates the retaining device.

Figure 6:
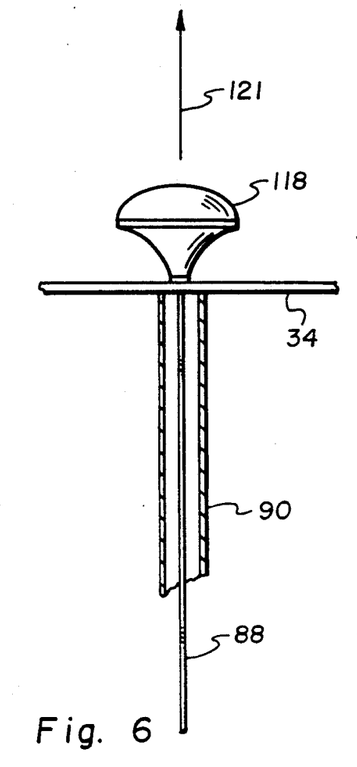
FIG. 6 is a side view of an alternative control means of the invention.

A conventional incline system is illustrated in U.S. Pat. No. 4,477,071 (Davis). FIG. 6 of that disclosure illustrates an adjustable incline system which includes an inverted "T"-shaped support leg having a plurality of open-ended channels defined in the shaft region thereof. The support leg is received within a socket. The socket sidewall defines a pair of oppositely positioned holes which are positioned to register one with another. A pin is inserted through the socket hole and thereafter through one of the support leg channels. The pin subsequently is received in the opposing socket sidewall hole whereby the support leg is detachably retained in the apparatus mounted socket. The incline of the apparatus may be altered by slidingly removing the pin and adjusting the support leg to align another channel in registration with the socket holes. Thereafter, the pin is reinserted to retain the support leg in the desired orientation. Recognizably, the apparatus must be lifted in order to facilitate any adjustment to its incline.

A second embodiment of an incline system is depicted in U.S. Pat. No. 4,374,587 (Ogden) wherein a pair of upright threaded support legs are mounted spacedly apart from one another on the end of a treadmill. The bottom end of each support is rotatably mounted by a ball joint to a footing which rests on the underlying support surface, e.g. the ground. A female threaded socket is mounted on each support, each socket being fixedly mounted to the apparatus to be inclined. One of the supports includes a hand crank mounted thereon. The crankable support is mechanically connected to the non-cranked support by a chain which is trained about sprockets mounted on each of the two supports. A cranked rotation of the first support effects a corresponding rotation of the second support. The sockets are displaced upwards or downwards, depending on the direction of rotation of the supports. The apparatus, being mounted to the sockets, is displaced by the sockets.

The Ogden construction involves a considerable amount of structure to effect the lifting or incline function.

A continued need exists for an inclined system which is at once simple in construction yet operative to yield a desired equipment incline with a minimum of energy.

SUMMARY OF THE INVENTION

The incline system of the invention includes a support means adapted for supporting an apparatus such as exercise equipment on an underlying surface, e.g., the ground or a floor. The support means is associated with the apparatus and may be pivotedly mounted thereto. A first spring means is mechanically associated with the support means and the apparatus. The first spring means is adapted to apply a force to the support means and the apparatus to thereby urge them outwardly away from one another. An elongate member having a plurality of apertures defined therein is mounted upright on the support means. The apertures are positioned spacedly along the length, i.e., the height of the elongate member. A housing is mounted on the apparatus which contains a slidably displaceable plunger shaft. A second spring means is mechanically associated with the plunger shaft to urge the plunger shaft outward from the housing. The plunger shaft is dimensioned to be received within the apertures defined in the elongate member. The housing is positioned sufficiently proximate the elongate member that the plunger shaft may be urged outwardly from that housing and engage the elongate member. Furthermore, the plunger shaft is adapted to be received within the apertures of that member and form a releasable union between the plunger shaft and hence the apparatus to which it is connected and the elongate member.

The plunger shaft is mechanically associated with a control means adapted for retracting the plunger shaft into the housing in opposition to the action of second spring means.

Operationally, the control means may be manipulated by the apparatus user to retract the plunger from its inserted position within an aperture of the elongate member. This operation permits the first spring means to urge the apparatus and support members apart, thereby increasing the inclination of the apparatus. As the incline increases, the positioning of the plunger shaft vis-a-vis the elongate member is modified. When the desired inclination is reached the control means is released, thereby permitting the second spring means to urge the plunger into an aperture in the elongate member to form a releasable union therewith. With the elongate member fixed in position, the support means is likewise fixed in place vis-a-vis the apparatus. This effectively fixes the orientation and incline of the apparatus.

To decrease the inclination of the apparatus, the user manipulates the control means to retract the plunger, freeing the support means and apparatus to move relative to one another. The user then must apply a force on the apparatus or support means, in opposition to the first spring means, thereby forcing the support means and apparatus toward one another. Upon the apparatus and support means being brought into sufficiently close proximity to yield the desired inclination, the control means is released, permitting the plunger to enter an appropriate elongate member aperture positioned adjacent the housing, thereby locking the support means in a fixed orientation vis-a-vis the apparatus.

DETAILED DESCRIPTION OF THE DRAWINGS

Figure 1:
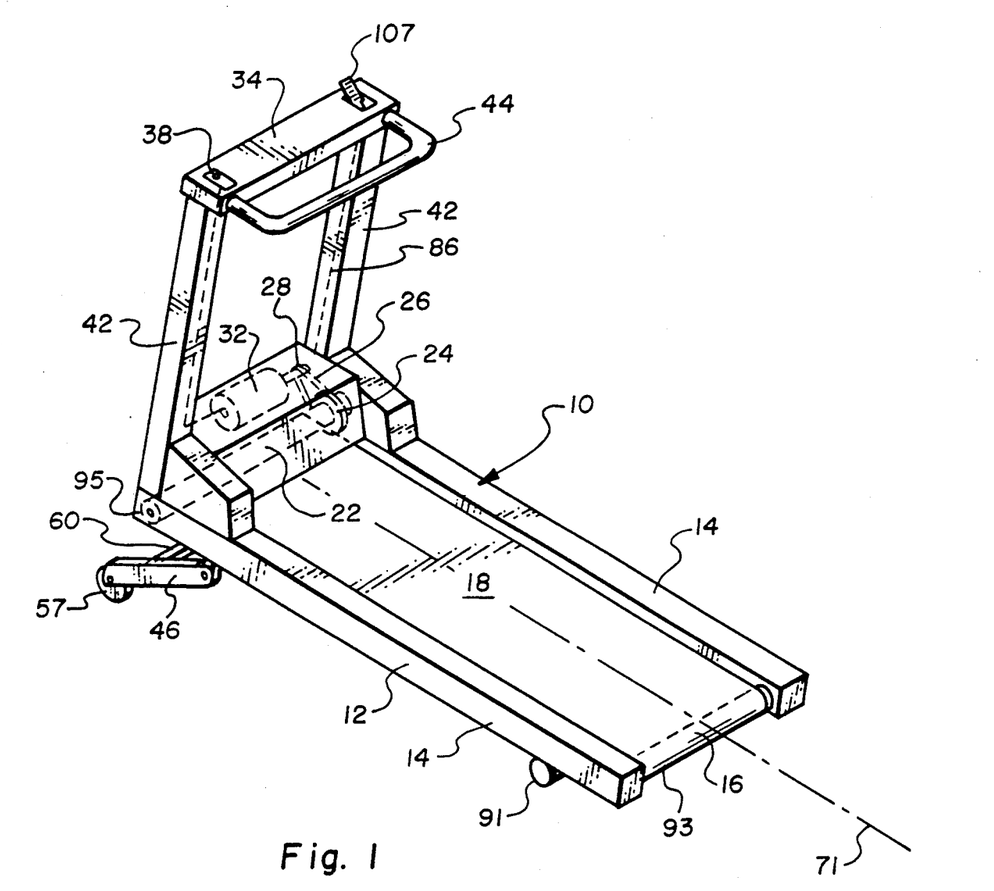
FIG. 1 is a perspective view of an apparatus, namely an exercise treadmill, fitted with an incline adjustment mechanism of the invention.

As illustrated in FIG. 1, a treadmill generally 10 is constituted by an elongate lower frame 12 having two rail-like members 14 positioned parallel and spacedly apart from one another. An elongate, cylindrical roller 16 is rotationally mounted to each of the frame rail members 14 to extend between those members to provide a path-defining structure for an endless belt 18 which is trained thereover. Positioned on the opposing end of the rail members 14 is a second elongate cylindrical roller 22 which is similarly rotationally mounted to extend between the frame rail members 14. A pulley 24 mounted on the second roller 22 has a belt 26 trained thereover, which belt 26 is also trained over a pulley 28 mounted to an electric motor 32. When the motor 32 is actuated, it rotates the pulley 28. In turn, pulley 28 rotates pulley 24 through means of belt 26. The roller 22 is in turn rotated, causing belt 18 to be driven over the rollers 16 and 22 in an endless continuous path. The operation of the motor 32 is controlled by electrical control means 38 mounted on the console 34. The control means 38 is electrically connected to the motor 32.

Console 34 is supported by two upright supports 42 which are mounted on frame rail members 14. Mounted on console 34 is a "U"-shaped bar 44 configured to be held by a user standing on the belt 18.

Figure 2:
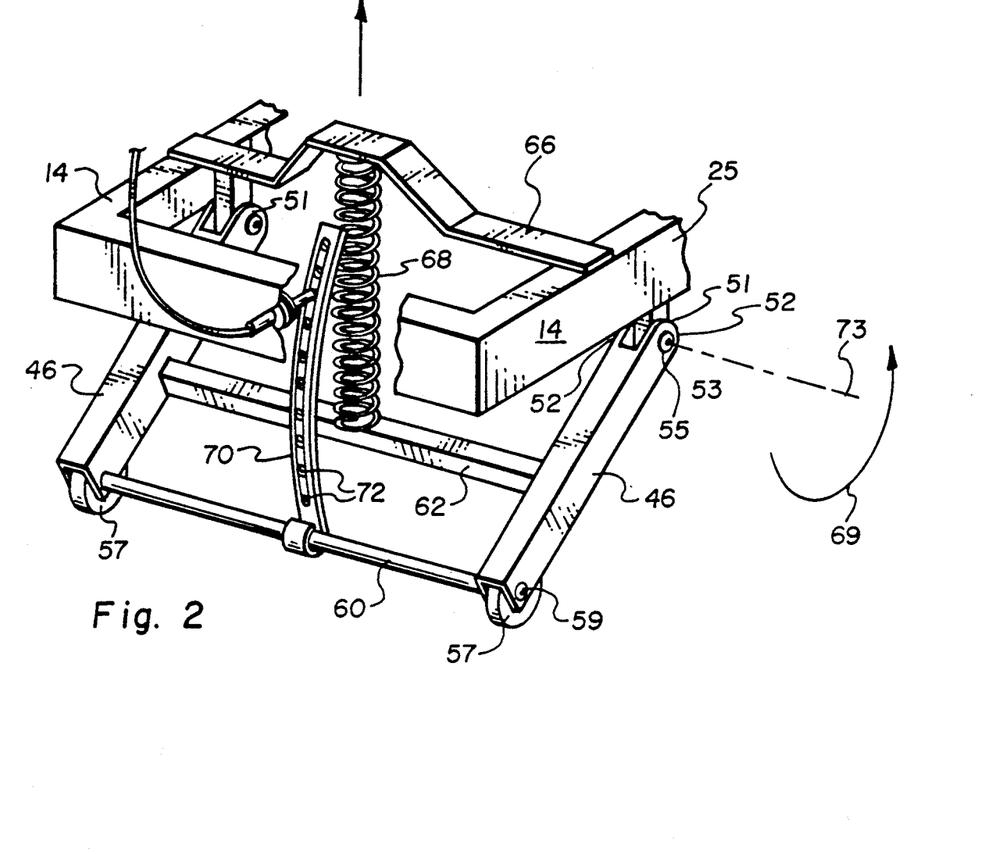
FIG. 2 is a partial elevated perspective view of the front end of the treadmill of FIG. 1, showing the various components of the incline adjustment mechanism.
Figure 3:
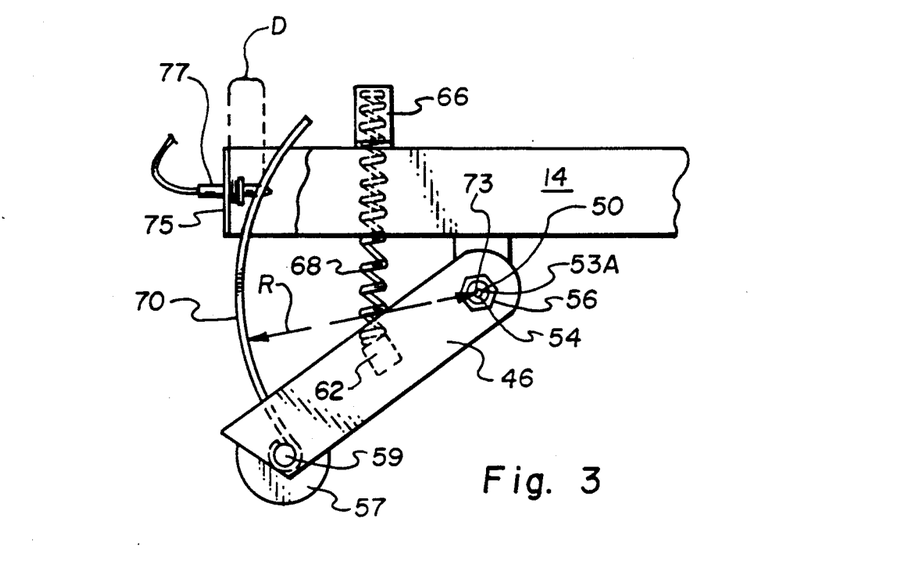
FIG. 3 is a side view of the incline adjustment of FIG. 2.
Figure 4:
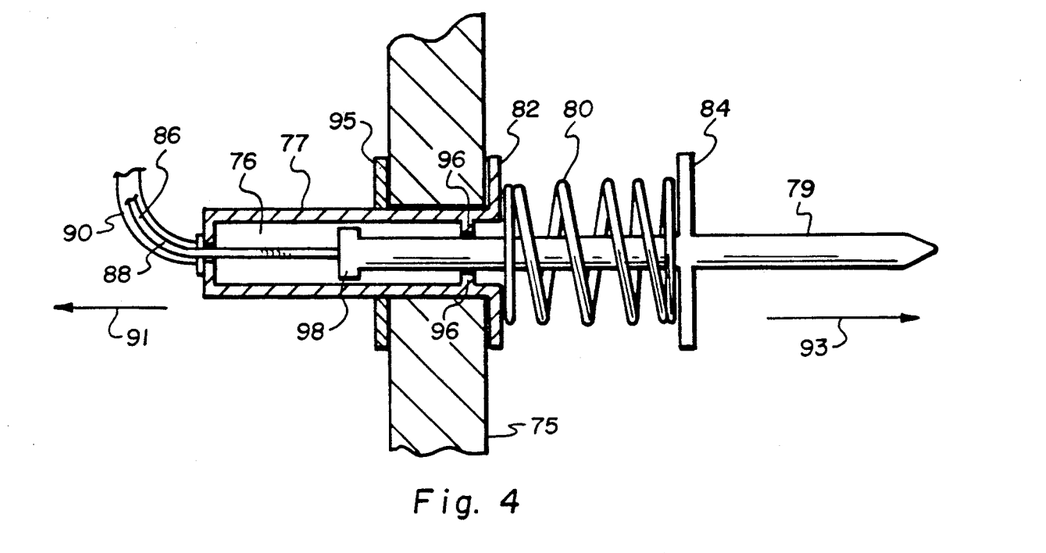
FIG. 4 is a cross-sectional view of a plunger housing assembly of the invention.
Figure 5:
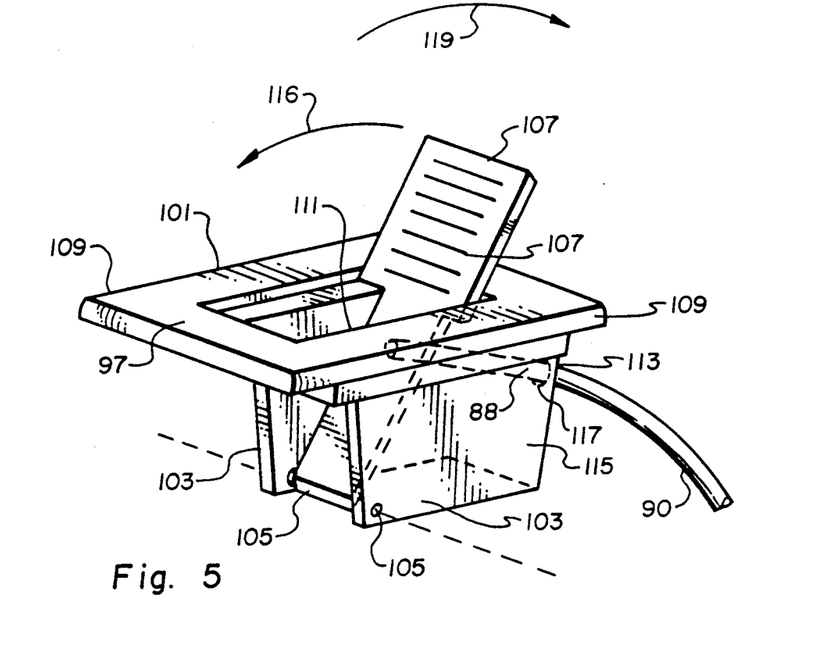
FIG. 5 is a perspective view of a control means of the invention.

FIGS. 2 and 3 illustrate in an elevated sectional perspective view some of the principal components of the adjustable incline system. A pair of elongate, shaft-like support legs 46 are each pivotally mounted to a respective frame rail member 14 by means of a nut and bolt arrangement 50. As shown, each support leg 46 includes, on a first end thereof, a bifurcated fork-like clevis 51. Each fork 52 of the clevis 51 defines an aperture 53 therein in register with an aperture defined within an opposing fork of the clevis 51. A shaft-like extension 54, mounted on each frame rail 14, defines a channel 53A therethrough. The channel 53A in the extension 54 is aligned with the apertures 53 in the bifurcated forks 52 of the clevis 51 and a bolt 55, having male threads on its end, is extended through the apertures 53 and channel 53A to form a pivot mounting for each support leg 46. A female threaded nut 56 is threadedly mounted on the bolt 55 to retain the bolt 55 in place.

A wheel 57 is rotatably mounted in the opposing end of each support leg by means of an elongate axle 58 formed by a nut and bolt arrangement 59 which passes through apertures defined in the support 46 similar to the above-described mounting of the support on extension 54. The support leg 46 as illustrated has a generally "U"-shaped cross-section when viewed from its end. Each wheel 57 is positioned to rollingly contact and abut against an underlying surface, e.g. the ground or floor, on which the treadmill 10 is placed.

A connection or cross bar 60 is mounted to each support leg 46 at a location intermediate the opposing ends of each support leg 46. In a preferred embodiment, the cross bar is mounted between the free ends of the support legs 46.

As further illustrated in FIG. 2, the cross-member 60 may be cylindrical in configuration and is oriented such that its longitudinal axis 65 is collinear with the axis of the wheels 57.

Support legs 46 and cross bar 60 may be fabricated from steel or some other rigid structural material.

FIG. 2 illustrates a second cross-member 62 which is mounted to each of the support legs 46 to extend therebetween. As shown, the cross-member has a quadrilaterally configured cross-section and is positioned between the mounting of the first cross-member 60 and the pivot mounting 50 of each support leg 46 on the treadmill frame 14. The cross-member 62 may be mounted to each support leg 46 midway between the opposing ends of its support leg 46.

Mounted on each of the opposing sides of the frame 14 is a spring support bracket 66. The support 66 extends between the opposing sides of the frame 14. A coil spring 68 is mounted on the bottom surface of the support 66 on its one end and is mounted on the cross-member 62 on its opposing end. The spring's mounting on the cross-member 62 and support 66 may be of a conventional construction, e.g., welding. The spring 68 is in a compressed condition in the orientation illustrated in FIG. 2 and thus exerts a vertically directed force upward against the frame 14 of the treadmill and a vertically directed force downward against the cross-bar 62. The magnitude of the spring force exerted by the spring exceeds the force imposed on the spring 68 by the mass of the treadmill. The spring 68 urges the treadmill 25 and the support legs 46 outwardly away from each other, thereby effecting a rotation of the support legs 46 about their pivot mounting 50 in the direction indicated by arrow 69.

Mounted on the cross-member 60 is vertically positioned, elongate curved member 70. As shown, this member is curved over its entire length and defines a plurality of apertures 72 therein. The apertures 72 are spacedly positioned along the height of the member 70. Member 70 is fabricated from a rigid material suitable for supporting the weight of the treadmill. As seen in FIG. 3, the member 70 is formed in the shape of an arc of a circle. The radius of curvature of the member is constant over the height, i.e., the length of the member 70. The radius of curvature of the member 70 is dimensionally equal to the distance from the pivot axis 73 of support leg 46 to the member 70, identified by the notation "R" in FIG. 3. The dimensioning of the member 70's radius of curvature facilitates the positioning of the member 70 at a substantially constant distance "D" from the front end cross-member 75 of the treadmill frame 25. Distance "D" remains constant as the support legs 46 are angularly rotated about the pivot axis 73. The member 70 is fixedly mounted to cross-member 60 so as to retain the radius of curvature relationship with the pivot axis 73 during the rotation of the member 70. In preferred constructions, the member 70 is mounted on a cross-bar 62 midway between the opposing support legs 46.

Mounted within cross-member 75 is an elongate housing 77 which defines a recess well 76 therein. The recess well 76 communicates with two opposing open ends of the housing. Displaceably mounted within the housing is an elongate, shaft-like plunger 79. As illustrated, the plunger 79 extends partially through the recess well 76 and extends outwardly from the housing 77. The plunger shaft 79 is dimensioned to be displaced to extend from its mounting in the housing sufficiently to engage the member 70 and pass through one of the apertures 72 defined in that member 76. Once the plunger shaft 79 is fully inserted into a respective aperture 72, the plunger shaft 79 effectively forms a union with the member 70. The pointed end of the shaft 79 assists in facilitating the entry of the shaft 79 into the aperture 72 given the less than orthogonal orientation of the shaft 79 and the surface of the member 70 proximate the aperture 72 and the tendency of that orientation to complicate the entry of the shaft 79 into the selected apertures. Due to the rigidity of the plunger 79, member 70 is locked into position by the engagement of the plunger 79 and the apertures of member 70. Due to the rigidity of the member 70, the support legs 46 are also locked into position. Upon the plunger shaft 79 being retracted back into its housing 77, the plunger shaft 79 is disengaged from the aperture 72, thereby disengaging the plunger 79 from the member 70 and freeing that member 70 for further rotation about axis 73.

Figure 7:
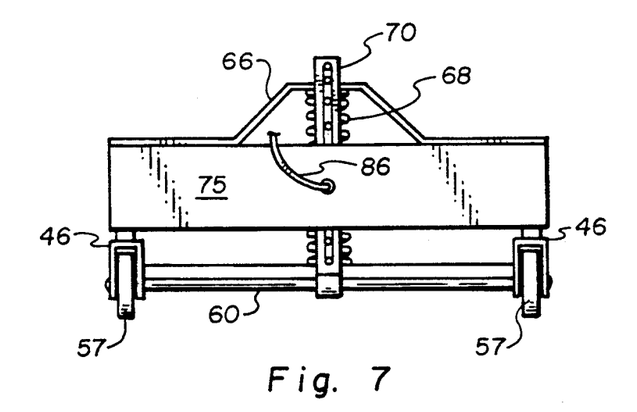
FIG. 7 is a front view of the incline adjustment mechanism of the invention in a lowered orientation.

A cross-sectional view of the plunger/housing assembly is shown in FIG. 7. As illustrated, a compressed coil spring 80 is mounted over the plunger shaft 79, i.e., the plunger shaft 79 passes through the interior of the spring 80. The spring 80 abuts against a collar flange or lip 82 of housing 77 on its first end. The opposing end of the spring 80 abuts against collar flange 84, which is mounted on plunger shaft 79. The spring 80 operates to urge the shaft 79 outward from within the housing 77.

Mounted on an end of the plunger shaft 79 is a control cable 86. As shown in FIG. 7, cable 86 includes a flexible metal core element 88 which is slidably retained within a hollow tubular sheath 90. The sheath 90 is secured to the end of housing 77. The core element is therefore free to be displaced within the sheath 90 and due to its mounting on plunger shaft 79, retract that plunger shaft 79 into the housing channel 76 in the direction indicated by arrow 91. Upon the core member 88 being displaced in the direction indicated by arrow 93, e.g., by the action of spring 80. The plunger shaft 79 is displaced outward from the housing 77.

The housing 77 is retained in place on the cross-member 75 by flanges 95 and 82. The plunger shaft 79 is retained at least partially within the channel 76 of housing 77 by retaining lips 97 which extend in to the channel 76 and the end flange 98 which is mounted on the end of the plunger shaft 79.

Figure 8:
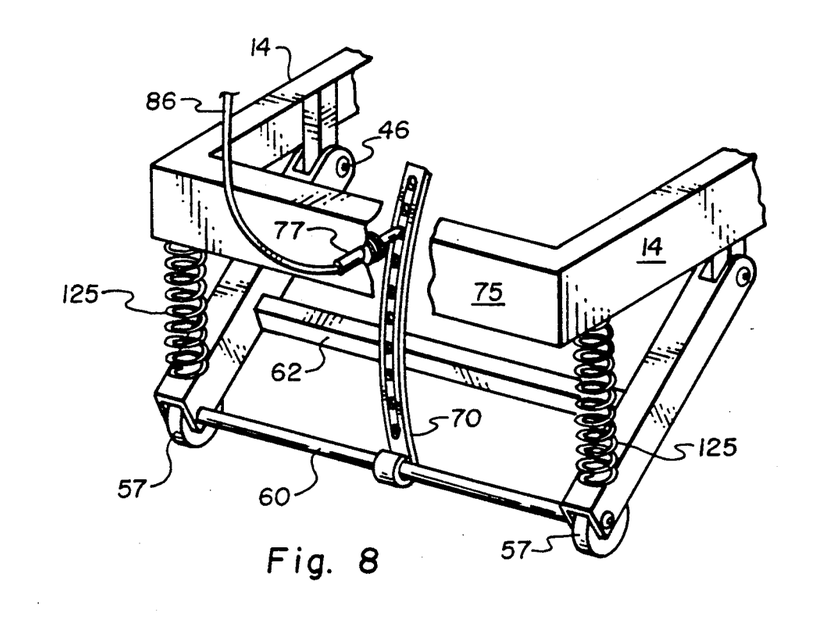
FIG. 8 is a perspective view of the incline adjustment system wherein an alternative first support means is illustrated.

FIG. 8 illustrates a control means 97 for manipulating the displacement of the cable 86. As shown, the mechanism 97 includes a housing 101 having threaded sidewalls 103. An axle 105 is journaled into the sidewalls 103 to extend therebetween. An elongate lever 107 mounted on the axle 105, forms a hand graspable handle which may be manipulated by a user. A planar cover member 109 is mounted atop the sidewalls 103. The cover member 109 defines an elongate opening 111 therein which permits the lever 107 to travel therethrough as the lever is pivoted about its axis of rotation defined by axle 105. The end 113 of sheath 90 is secured to an endwall 115 of the housing 101. The core element 88 is slidably mounted in the sheath 90 and extends through an opening 117 in endwall 115. Core element 88 is mounted on its end to lever 107. Recognizably, as the lever 107 is urged in the direction indicated by arrow 117, the core element 88 is pulled through the sheath 90, thereby causing the plunger shaft to be displaced in the direction indicated by arrow 91. As the lever 107 is pushed in the direction indicated by arrow 119 the plunger shaft 79 is displaced in the direction 93 due to the action of the spring 80.

In an alternative construction, the flexible core element 88 may be replaced by a substantially rigid wire. This substitution would eliminate the need for a return spring 80 in that the rigid wire could forceably displace the plunger shaft 79 in both directions.

FIG. 6 illustrates an alternative control means wherein a knob 118 is positioned atop the console 34, and is connected to a wire 88 which is displaceably housed within a sheath 90. The knob 118 may be grasped by the user and pulled outward in the direction indicated by arrow 121, thereby displacing the plunger 79 which is mounted to the opposing end of wire 88 as has been previously described.

Mounted on cross-member 75 is a plurality of guides 120 which are adapted to engage elongate member 70 and form a means of guiding that member 70 along its generally vertically directed displacement path. As shown, these guides 120 may include a curvilinear surface corresponding generally to the shape of the elongate member on which the member 70 rides.

Figure 9:
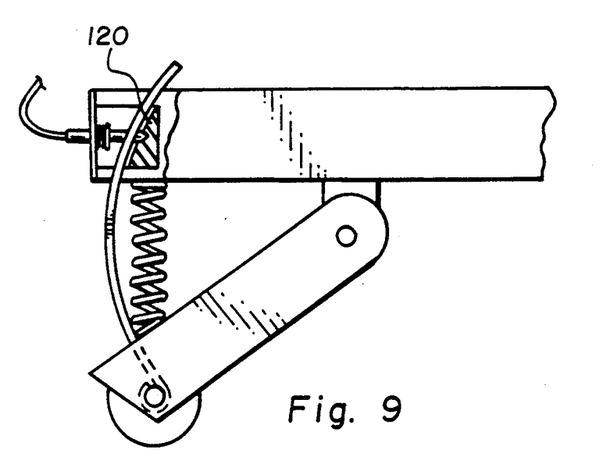
FIG. 9 is a side view of the incline adjustment means of FIG. 8.
Figure 10:
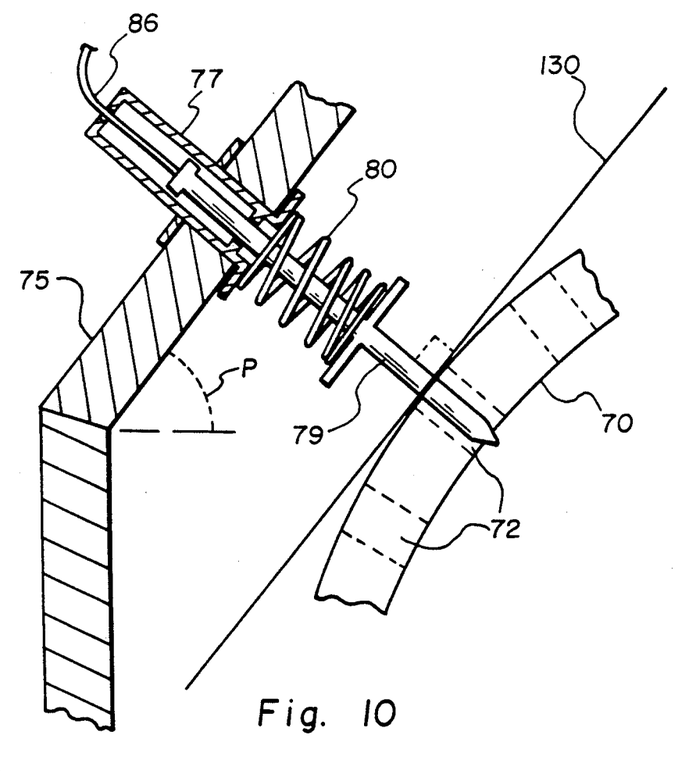
FIG. 10 is a cross-sectional side view of an alternative plunger housing assembly of the invention.

Various alternative arrangements of the components of the invention are contemplated. Some of those alternatives are illustrated in FIGS. 8-10. As shown in FIGS. 8-9, the coil spring 68 may be replaced by a pair of coil springs 125. Each of the springs 125 is mounted on its first end to a siderail 14 of the treadmill. The second end of each spring 125 is mounted on its opposing end to a respective support leg 46. Each spring 125 is of a coil spring configuration and is oriented generally upright so as to apply a generally vertically directed force against the respective support leg 46.

FIG. 10 illustrates an alternative arrangement for the plunger shaft 79 and its associated housing 77. Whereas in the previously described embodiment, the plunger shaft 79 was oriented to extend outward generally laterally of the treadmill frame, in FIG. 10, the housing 77 and the plunger shaft 79 are oriented at an angle "P" to the general plane of the treadmill frame 25. This particular orientation provides for a more direct entry of the plunger shaft 79 into its targeted aperture 72 than the non-orthogonal plunger/elongate member configured as previously described. In this alternative embodiment, the longitudinal axis 127 of the plunger shaft 79 is positioned so as to be substantially orthogonal to a plane 130 tangent to the surface of the member 70 proximate the aperture 72 in which the shaft 79 is to be inserted.

In operation, the incline adjustment system of the invention functions as follows. To vary the incline of the apparatus, i.e., the treadmill, the user pushes the lever 107 in the direction indicated by arrow 116. This causes core element 88 to be displaced in the direction indicated by arrow 91. This displacement in turn causes the plunger shaft 79 to be withdrawn from a retaining engagement in an aperture 72 in member 70. Once the plunger shaft 79 is withdrawn out of engagement with the member 70, the support legs 46 are free to be displaced upwardly or downwardly, by a pivoting motion about the pivot axis defined by mounting 50. To increase the incline the user permits the spring 68 to urge the support legs 46 outward from the frame 14 in the direction indicated by arrow 69. Upon the treadmill reaching a desired inclination, the lever 107 is released, thereby permitting the spring 80 to urge the plunger 79 in the direction indicated by arrow 93 until that shaft 79 enters and is received within the most proximate aperture 72 in the member 70. Upon its reception therein, a releasably disjoinable union is formed between the plunger 79 and the member 70, thereby locking that member 70 in place and forming a rigid support mounting for the treadmill, configured to retain that treadmill in the preselected inclination. To achieve a lower inclination, as opposed to increasing the inclination, the user must apply a force on the spring 68 to overcome the spring force generated by that spring. This force application may be achieved by the user standing on the treadmill, especially at a location over and atop the location of the spring 68. With the plunger shaft 79 in its retracted position the user may select a treadmill inclination, as the treadmill is urged downward toward the ground. Upon reaching the selected inclination, the user releases the lever 107 allowing the plunger shaft 79 to be inserted into the appropriate aperture 72 by the action of spring 80.

It is to be understood that the embodiments of the invention described are merely illustrative of the application of the principles of the invention. Reference herein to details of the illustrated embodiment is not intended to limit the scope of the claims which themselves recite those features regarded as essential to the invention.

What is claimed is:

1. An adjustable incline system in combination with an apparatus operable in different angular orientations, said incline combination comprising:

a support means mounted to an apparatus for supporting said apparatus above a support surface, said support means including a pair of support legs, said support legs being pivotedly mounted spacedly apart from one another on said apparatus;

a first spring means mechanically associated with said support means and said apparatus for applying a force against said support means and said apparatus, thereby urging said support means and said apparatus outwardly away from one another;

an elongate member, mounted upright on said support means, said member defining a plurality of apertures, said apertures being spacedly arranged along a length of said member;

a plunger slidably mounted within said housing, said plunger being dimensioned to be received into and seated in each of said apertures to form a releasable union therewith, wherein said plunger is adapted to retain said elongate member and its associated support means in a selected orientation with respect to said apparatus;

a second spring means mounted in said housing to bias against said plunger, said second spring means urging said plunger into engagement with said elongate member and more particularly into engagement with said apertures;

a control means connected to said plunger for withstanding said plunger away from said elongate member;

wherein an inclination of said apparatus is adjustable by said control means disengaging said plunger from its seating in a first aperture of said elongate member, which permits said first spring means to readjust an inclination of said apparatus to a selected orientation; a subsequent insertion of said plunger into a second aperture of said elongate member functioning to retain on said support surface said apparatus in its selected inclined orientation on said support surface.

2. The incline system of claim 1 wherein said support means includes a pair of support legs, pivotally mounted spacedly apart from one another on said apparatus.

3. The incline system of claim 1 wherein each support leg has a first end and a second end, said first end of each said support leg being pivotally mounted to said apparatus.

4. The incline system of claim 3 wherein a first connection bar is mounted to each said support leg to extend between said support legs.

5. The incline system of claim 4 wherein said first connection bar is mounted to each support leg intermediate said first end and said second end, said first spring means being mounted on said first connection bar.

6. The incline system of claim 1 wherein said elongate member is mounted medially between said support legs.

7. The incline system of claim 5 wherein said elongate member is mounted to a second connection bar, said second connection bar being mounted to each of said support legs to extend therebetween, said elongate member being mounted to said second connection bar midway between the ends of said first connection bar.

8. The incline system of claim 1 wherein said elongate member is curved along a length thereof.

9. The incline system of claim 7 wherein said elongate member is a curved member, mounted on said second connection bar, said elongate member being slidably received in a guide mounted on said apparatus.

10. The incline system of claim 1 wherein said first spring means comprises a pair of coil springs, each said coil spring being mounted on its first end on a respective support leg and on its second end to said apparatus.

11. The incline system of claim 1 wherein said first spring means comprises a single coil spring mounted on its first end to a first connection bar which extends between said support legs, said first spring means being mounted on its second end to said apparatus.

12. The incline system of claim 1 wherein said plunger is slidably and displaceably mounted in said housing to extend laterally from said apparatus into engagement with said elongate member.

13. The incline system of claim 1 wherein said control means comprises:
a hand graspable handle; and
a wire mounted its first end to said hand graspable handle, said wire being displaceably mounted within a sheath mounted on said apparatus, said wire being mounted on its second end to said plunger.

14. The incline system of claim 10 wherein said control means includes a control knob reciprocally mounted on said apparatus, remote from said elongate member, and a cable having a proximal end and a distal end, said proximal end being connected to said plunger, said distal end being connected to said control knob, wherein a displacement of said control knob effects a displacement of said cable and a resultant displacement of said plunger.

15. An adjustable incline system in combination with an apparatus operable in different angular orientations, said incline system comprising:
a pair of support legs spacedly positioned apart from one another, each support leg having a first end pivotally mounted to an apparatus to be supported, each support leg having a second opposite end fitted with a rotatably mounted wheel;
an elongate connection bar mounted at its ends to said support legs and extending therebetween;
a first spring means mounted on said supported legs and said apparatus to extend therebetween for urging said support legs and said apparatus outwardly away from one another;
an elongate member slidably mounted on said apparatus, said member being mounted on said elongate connection bar, said elongate member defining a plurality of apertures therein spacedly positioned along a length of said elongate member;
a housing mounted on said apparatus adjacent said elongate member;
a plunger, slidably and displaceably mounted within said housing, said plunger being extendible from said housing to engage said elongate member, said plunger being dimensioned to be received within said apertures of said elongate member;
a second spring means mounted in said housing for urging said plunger out of said housing and into said elongate member-defined apertures to form a releasable union of said plunger and said elongate member;
a cable having a proximal end and a distal end, said cable being connected on said proximal end to said plunger; and
a control knob displaceably mounted on said apparatus, said cable distal end being fixedly mounted to said control knob, wherein a displacement of said control knob retracts said plunger into its housing and out of engagement with said elongate member causing said leg supports to rotate about their pivots thereby raising or lowering said apparatus.

16. The incline system of claim 15 wherein said cable is comprised of a solid elongate core slidably retained in a sheath, said sheath being fixedly mounted to said plunger housing.

17. The incline system of claim 15 wherein said connection bar is mounted to each support leg proximate said second end of each said support leg.

18. The incline system of claim 17 wherein said elongate member is mounted to said connection bar medially between said support legs.

19. The incline system of claim 15 wherein said control means is positioned on said apparatus at a location wherein a user standing on said apparatus may reach and actuate said control knob.

* * * * *

UNITED STATES PATENT AND TRADEMARK OFFICE
CERTIFICATE OF CORRECTION

PATENT NO. : 5,029,801

DATED : JULY 9, 1991

INVENTOR(S) : WILLIAM T. DALEBOUT; S. TY MEASOM; SCOTT R. WATTERSON

It is certified that error appears in the above-identified patent and that said Letters Patent is hereby corrected as shown below:

```
     COL. 6, line 5, after "80" change "." (period) to ---,---(comma)
        and make the "T" a ---t--- in the word "The".
```

Col. 8, line 22-23, delete "withstanding" and add---withdrawing---.

Col. 9, line 35, delete "supported" and add ---support---.

Signed and Sealed this

Fifth Day of October, 1993

Attest:

BRUCE LEHMAN

*Attesting Officer*     *Commissioner of Patents and Trademarks*